United States Patent Office 3,642,721
Patented Feb. 15, 1972

3,642,721
METAL-CONTAINING POLYMERS OF ORGANIC DITHIOLIC ACID AND METHODS OF MAKING THE SAME
Judith A. Walmsley, Sylvania, Ohio, assignor to Owens-Illinois, Inc.
No Drawing. Filed Jan. 22, 1968, Ser. No. 699,338
Int. Cl. C08g 17/00
U.S. Cl. 260—78.4 R                9 Claims

ABSTRACT OF THE DISCLOSURE

Polymers are prepared from divalent metal salts such as nickel chloride and organic dithiol acids such as dithiolterephthalic acid to provide a polymer having the following recurring unit:

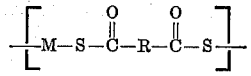

where M is a metal such as nickel, zinc and tin and R is an organic hydrocarbon radical. The polymers are useful as fillers and modifiers for other polymers and for forming films and coatings on bases such as glass.

---

The present invention relates to a method of making a polymer by reacting an organic dithiol acid with a metal salt and to methods of making such a polymer.

It is an object of the present invention to provide a new polymer that is the reaction product of an organic dithiol acid with a metal salt to provide a polymer having the following recurring unit:

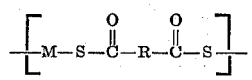

where M is a metal and R is a divalent organic hydrocarbon radical.

It is an object of the present invention to provide a method of making a coordination polymer by reacting an organic dithiol acid with a metal salt and the polymer prepared therefrom.

It is an object of the present invention to provide a polymer of an organic dithiol acid with a metal salt such as a salt of nickel, zinc, tin, copper, or cadmium and a method of preparing the polymer.

It is an object of the present invention to provide a polymer of a metal salt and a dithiolterephthalic acid.

It is an object of the present invention to provide a polymer of a metal salt and dithiolisophthalic acid.

These and other objects will become apparent from the specification that follows and the appended claims.

The present invention provides a method of making a polymer comprising the steps of mixing and reacting an organic dithiol acid with a metal salt to provide a polymer having the following recurring unit:

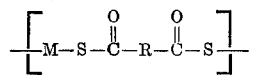

where M is a metal and R is an organic hydrocarbon radical.

The present invention also provides a new polymer made by the above-described method.

Suitable dithiol acids are alkyl and aromatic organic dithiol acids having two functional

groups. When R in the above-described formula is an alkylene group, the preferred number of carbon atoms in the alkylene groups is from 4 to 6 such as butylene, isobutylene, pentylene and isopentylene, excellent results being obtained with 4 carbon atoms. In general, the alkylene group can have from 1 to 10 carbon atoms.

The aromatic dithiol acids are preferred over the alkyl dithiol acids, the best acids being dithiolphthalic acid, dithiolterephthalic acid and dithiolisophthalic acid. Although the preferred aromatic acid has a benzene ring with two

groups, the aromatic group can be one derived from naphthalene.

The metal for the metal salt is preferably nickel, zinc, cadmium, tin, or copper, or other transition metal. However, metal salts of other metals such as cobalt, silver, mercury, gold and iron can be used to form polymers in accordance with the present invention.

The preferred metal salts are nickel chloride, dibutyl tin chloride, zinc chloride and cadmium chloride. Other metal salts such as nickel (II) thiocyanate and salts of inorganic and organic acids such as nitric, sulfuric, acetic, propionic and citric can be used.

The polymers that have been prepared are apparently coordination polymers that have good hydrolytic stability and a high thermal stability of 250–300° C. in air. While not wishing to be bound by theory, the polymers appear to be true coordination polymers with the bonding of the organic radicals to the metal occurring through both the sulfur atom and the oxygen atom of the thiolcarboxylate group. The tin, cadmium and zinc polymers appear to be substantially linear in structure.

The preferred method of preparing the polymers of the present invention is the reaction of a metal salt with a dithioldicarboxylic acid in the presence of NaOH. Apparently a disodium salt is formed in the reaction which in turn reacts with the metal salt, usually a metal halide dissolved in an organic solvent, to form the resultant polymer. One preferred method of reacting the metal salt with the dithioldicarboxylic acid in the presence of NaOH is to react the dithiol acid with NaOH to obtain a solution of the disodium salt. A metal salt is added to the disodium salt solution and the resultant solution or mixture refluxed for several hours to provide the polymer. Suitable organic solvents for the reaction of the disodium salt and the metal salt are n-propanol, cyclohexanol, acetone, tetrahydrofuran, dimethyl sulfoxide, and 1-methyl-2-pyrrolidinone. The preferred solvents are n-propanol and tetrahydrofuran. 1-methyl-2-pyrrolidinone appeared to retain the polymer in solution for a longer period than other solvents, but the final polymer appeared to be of lower molecular weight. The alcohols that were used as solvents were satisfactory and there was no evidence of the esterification of the disodium salt.

The metal salt can also be reacted with the disodium salt of the dithiol acid in a non-aqueous system. However, there was no apparent advantage over the use of an aqueous system and the isolation of the anhydrous disodium salt was difficult because they apparently formed strong hydrates. When the non-aqueous system is used, the preferred solvent is 1-methyl-2-pyrrolidinone, although other solvents previously mentioned can also be used.

In the case of a metal thiocyanate, such as nickel(II) thiocyanate, and its reaction with a dithioldicarboxylic acid, infrared spectra and analytical data indicated that these thiocyanate groups were retained in the product and a complex may have been formed. Although not a preferred method, the metal salt and the dithiol acid can be reacted by melt polymerization under vacuum but the resultant polymers, when formed, apparently are of a lower molecular weight than those formed by the previously described aqueous systems.

In the reaction, the amount of metal salt used is preferably about ½ to 1½ equivalent weights of metal salt per equivalent weight of dithiol acid although the best results are obtained with about 1 equivalent weight of metal salt per equivalent weight of acid. The reaction can be carried out from above room temperature, say preferably at least about 60° C., to the reflux temperature and time of reaction can be from about 1 to 12 hours or more with the best results being obtained at about 3 to 4 up to about 5 hours.

The following examples are intended to illustrate the present invention and not to limit the same:

EXAMPLE 1

Dithiolisophthalic acid was synthesized according to well-known procedures for preparing organic dithiol acids such as set forth in an article by Marvel and Kotch, Journal of the American Chemical Society, 73, 1100 (1951). Two hundred ml. of distilled pyridine (2.48 moles) were introduced into a one liter 3-necked flask fitted with an overhead stirrer, reflux condenser, addition funnel and gas inlet. The flask was cooled in an ice bath and the pyridine saturated with $H_2S$ (from a cylinder) by bubbling the gas through the solution for 25 minutes. A solution of 40.6 g. isophthaloyl chloride (0.2 mole) in 50 ml. of dry benzene was placed in the addition funnel and added dropwise to the cold solution over a period of 20 minutes. $H_2S$ introduction was continued throughout the addition and for another 30 minutes. Dry nitrogen was then introduced into the system for 25 minutes to remove excess $H_2S$. The reaction mixture was viscous and yellow. Four Hundred and twenty ml. of 6 N $H_2SO_4$ (1.25 moles) were added dropwise to the reaction mixture. The final yellow solid was suction filtered, washed with cold water and dried in a vacuum oven at 40° C. The acid was recrystallized from benzene and the yield was 26.7 g., 66% with a melting point of 72–77° C. The theoretical percentages by weight of carbon and hydrogen for

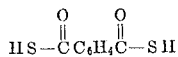

are 48.46% for C and 3.05% for H. The experimental percentages by weight were 49.15% for C and 3.50% for H.

EXAMPLE 2

Dithioladipic acid was prepared in a similar manner, except the adipyl chloride was added to the pyridine-$H_2S$ solution without the use of an additional solvent. After the neutralization with 6 N $H_2SO_4$, the reaction mixture was extracted with benzene. The benzene layer was dried over anhydrous $Na_2SO_4$ and most of the solvent evaporated under vacuum at room temperature. Final traces of solvent and water were removed under vacuum at 35° C. Dithioladipic acid (DTAA) is a clear, yellow liquid. The yield was 28.6 g. 80% and the melting point was 22–24° C.

EXAMPLE 3

This example illustrates the preparation of a polymer from a dithiol acid and a metal salt. Dithiolterephthalic acid (DTTA) (7.93 g., 40 mmoles) was weighed into a 250 ml. flask and reacted with 41 ml. of 1.92 N NaOH (79 mmoles) by heating to 60–70° C. A solution of 12.2 g. of $(n—C_4H_9)_2SnCl_2$ (40 mmoles) in 75 ml. tetrahydrofuran was added dropwise, with stirring, to the warm solution. A yellow precipitate formed immediately and gradually lightened in color as the addition proceeded. Reflux was continued for two hours. The refluxed mixture was cooled, suction filtered, and washed thoroughly with water, followed by tetrahydrofuran (THF) and acetone. The product was dried under vacuum at 50° C. and a light yellow powder obtained. The yield was 17.0 g., 99% and the melting point was 307° C. The theoretical percentages by weight of carbon and hydrogen for

44.78 for C and 5.17 for H. The experimental percentages were 42.97 for C and 5.36 for H.

EXAMPLE 4

This example illustrates the preparation of another polymer, starting with dithiolisophthalic acid (DTIA) as the organic dithiol acid and dibutyl tin chloride as the divalent metal salt. A polymer was prepared using the same quantities and procedure as described in Example 3. The product was a light orange powder, the yield being 15.0 g., 88% and the melting point being 240° C. The theoretical percent C and H are the same as in Example 3 and the experimental percentages are 44.0 for C and 5.75 for H.

EXAMPLE 5

Dithioladipic acid (3.56 g., 20 mmoles) was reacted with 20.8 ml. of 1.92 N NaOH (40 mmoles) and 6.11 g. of $(n—C_4H_9)_2SnCl_2$ (20 mmoles—dissolved in 35 ml. THF) according to the procedure used for $(C_4H_9)_2Sn—$ DTTA in Example 3. The mixture was refluxed for four hours and two layers formed. The upper, organic layer red-brown and was separated from the aqueous layer. was red-brown and was separated from the aqueous layer. The solvent was evaporated from the organic layer and the product dried under vacuum at 90° C. The polymer is a red, viscous liquid. It apparently contained some impurity because the yield was slightly higher than the theoretical. Molecular weight—3160 ($n=8$). Theoretical for

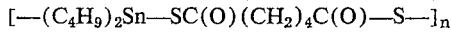

41.0% C. and 6.41% H. The experimental percentages were 39.8% for C and 6.49% for H.

EXAMPLE 6

A polymer was prepared from dithiolterephthalic acid and a zinc salt. Dithiolterephthalic acid (5.05 g., 25 mmoles) in 50 ml. of n-propanol was reacted with 25.0 ml. of 1.92 N NaOH (48 mmoles). "Anhydrous" $ZnCl_2$ (3.4 g., 25 mmoles) was added to the solution and it was refluxed for four hours. A light yellow precipitate gradually formed. The reaction mixture was suction filtered and the solid was washed with water and acetone. The product was dried in a vacuum oven at 60° C. for one hour. The polymer is a light orange powder which is slightly soluble in hexamethylphosphoramide, dimethylsulfoxide, dimethylformamide and 1 - methyl-2-pyrrolidinone. Yield: 6.8 g., 91%. Theoretical for

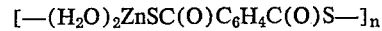

32.28% for C and 2.71% for H. Experiment: 30.90% for C and 2.97% for H.

EXAMPLE 7

A Zn-dithiolisophthalate polymer was prepared from dithiolisophthalic acid and zinc chloride as starting materials. Dithiolisophthalic acid (1.98 g., 10 mmoles) was reacted with 10.4 ml. of 1.92 N NaOH (20 mmoles) by warming (65–75° C.) a mixture of the two under $N_2$. "Anhydrous" $ZnCl_2$ (1.36 g., 10 mmoles) was dissolved in 30 ml. n-propanol and added dropwise to the solution. An orange precipitate began to form as soon as the addition was started. The reaction mixture was refluxed for three hours and cooled under $N_2$. The reaction mixture was poured into 400 ml. of distilled $H_2O$, with stirring. A light orange precipitate formed which was filtered, washed with a small amount of $H_2O$, and dried under vacuum at 90° C. for 2 hours. Yield: 1.6 g., 54%. Theoretical for $[—(H_2O)_2ZnSC(O)C_6H_4C(O)S—]_n$: 32.28% C and 2.71% H. Experimental: 30.27% C and 1.95% H.

Clear, yellow films were prepared on glass plates from dimethylsulfoxide and 1-methyl-2-pyrrolidinone solutions of the polymer.

EXAMPLE 8

A Cd-dithiolterephthalate polymer was prepared from a cadmium salt and an organic dithiolacid. Dithiolterephthalic acid (1.98 g., 10 mmoles), 10.0 ml. of 1.92 N NaOH (19.2 mmoles) and 2.19 g. of $CdCl_2.2H_2O$ (10 mmoles) in 50 ml. n-propanol were reacted in the same manner as described in Example 6 for the Zn-DTTA polymer. The polymer was an orange powder, slightly soluble in dimethylformamide. Yield: 2.3 g., 68%. Theoretical for $[—(H_2O)_2Cd—SC(O)C_6H_4C(O)S—]_n$: 27.9% C and 2.34% H. Experimental: 21.73% C and 1.57% H.

EXAMPLE 9

Dithiolisophthalic acid (3.96 g., 20 mmoles) was dissolved in 10 ml. THF. A slurry of 3.50 g. of $Ni(SCN)_2$ (20 mmoles) in 70 ml. THF was added to the acid solution. Nitrogen was bubbled through the mixture during the reaction and the mixture refluxed for four hours. The reaction mixture gradually turned from yellow-green to a dark red color and a dark red precipitate formed. The reaction mixture was poured into one liter of distilled $H_2O$ and a dark red, gummy solid separated out. The water was decanted and 200 ml. acetone was added to the solid. The mixture was suction filtered and washed with acetone. The red-brown powder was dried under vacuum at 50 C. for three hours. Yield 0.95 g. Theoretical for

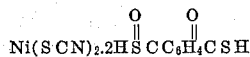

37.84% for C, 2.12% for H and 4.90% for N. Theoretical for

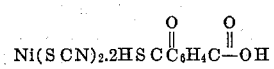

40.09% C, 2.24% H and 5.20% N. Experimental: 39.35% C, 2.14% H and 4.71% N.

Reactions were carried out between $Ni(SCN)_2$ and dithiolterephthalic acid and dithioladipic acid in the same manner as described in this example. All of the products contained the thiocyanate group.

The infrared spectra of the polymers prepared according to the above examples were measured on a Perkin-Elmer Model 621 Recording Spectrophotometer. They were obtained as KBr pellets and as Nujol mulls.

Thermal characterization was conducted on the polymers of the above examples with a Du Pont 900 differential thermal analyzer. The thermograms were run in air and in helium.

The infrared spectra of the polymers were useful in determining compound formation and also the nature of the compound or polymer. For interpretation purposes, the region of 1500–1700 cm.$^{-1}$, where the carbonyl stretching frequencies were found, was the most useful. The carbonyl frequencies in the compounds were lowered by 30–165 cm.$^{-1}$ as compared to that in the free acids. This means that there has been a decrease in the bond order of the carbon-oxygen bond. Again, not wishing to be bound by theory, the large shift in this frequency is believed to be caused by coordination of a pair of the non-bonding electrons on the oxygen to the metal atom. Therefore, the bonding in the metal dithioldicarboxylate polymers may be pictured in the following manner:

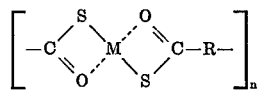

where M is a divalent metal.

The greater the degree of shifting of the carbonyl stretching frequency, the stronger the coordination of the oxygen to the metal. Using this criterion, it can be seen that most of the polymers prepared are coordination polymers.

Differential thermal analysis provided information about oxidative and thermal degradations, softening points, and in some cases, rearrangements and dehydration.

For example, the thermal data for the dibutyl tin-dithioldicarboxylic polymers are set forth in Table 1.

TABLE 1.—THERMAL DATA FOR $(C_4H_9)_2Sn$-DITHIOLDICARBOXYLIC POLYMERS

| Compound | Melting point, ° C. | Thermal degradation, ° C. |
|---|---|---|
| $(C_4H_9)_2Sn$-DTTA | 305 | 315 |
| $(C_4H_9)_2Sn$-DTIA | 243 | 290 |
| $(C_4H_9)_2Sn$-DTAA | (¹) | |

¹ Gum at room temperature.

In the above working examples, other organic dithiol acids previously mentioned as useful acids can be substituted in whole or part for the dithiol acids actually used. Likewise, metal salts listed previously as useful can be substituted in whole or part for the metal salts used in the working examples to provide substantially equivalent results. Other modifications of the present invention may be made without departing from the scope and the spirit thereof.

What is claimed is:

1. A solid polymer that is the reaction product of about one equivalent weight of an organic dithiol acid and about ½ to 1½ equivalent weights of a metal salt at about room temperature to reflux temperature for about 1 to 12 hours, the reaction product having the following recurring unit:

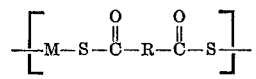

where M is a metal and R is an organic hydrocarbon radical.

2. A polymer as defined in claim 1 in which the dithiol acid is dithiolterephthalic acid.

3. A polymer as defined in claim 1 in which the dithiol acid is dithioladipic acid.

4. A polymer as defined in claim 1 in which the metal is nickel.

5. A polymer as defined in claim 1 in which the metal is zinc.

6. A polymer as defined in claim 1 in which the metal is tin.

7. A polymer as defined in claim 7 in which the metal is copper.

8. A polymer as defined in claim 1 in which the metal is nickel and the dithiol acid is dithiolterephthalic acid.

9. A polymer as defined in claim 1 in which the metal is zinc and the dithiol acid is dithiolisophthalic acid.

References Cited

UNITED STATES PATENTS

| 2,561,208 | 7/1951 | Kirk | 260—429 |

FOREIGN PATENTS

| 245,814 | 1/1960 | Australia | 260—429.7 |
| 1,120,683 | 7/1968 | Great Britain | 260—429.7 |
| 6,603,742 | 9/1966 | Netherlands | 260—78.4 |

OTHER REFERENCES

Marvel, C. S., and Kotch, A., J. Am. Chem. Soc., 73, 1100 (1951).

Andrews, T. M. et al., J. Am. Chem. Soc., 80, 4102–4104 (1958).

JOSEPH L. SCHOFER, Primary Examiner

C. A. HENDERSON, JR., Assistant Examiner

U.S. Cl. X.R.

117—124; 260—30.4 R, 30.6 R, 32.4 R, 32.6 R, 33.4 R, 502.6

UNITED STATES PATENT OFFICE
CERTIFICATE OF CORRECTION

Patent No. 3,642,721                    Dated February 15, 1972

Inventor(s) Judith A. Walmsley

It is certified that error appears in the above-identified patent and that said Letters Patent are hereby corrected as shown below:

Col. 4, line 19, the formula should read: $[-(C_4H_9)_2Sn-SC(O)C_6H_4C(O)S-]_n$ ; delete line 42 which reads [red-brown and was separated from the aqueous layer.]. Col. 5, line 50, the formula should read: $Ni(SCN)_2 \cdot 2HS\overset{O}{\overset{\|}{C}}C_6H_4\overset{O}{\overset{\|}{C}}SH$ ; line 55, the formula should read: $Ni(SCN)_2 \cdot 2HS\overset{O}{\overset{\|}{C}}C_6H_4\overset{O}{\overset{\|}{C}}-OH$ . Col. 6, line 2, "were" should be --are--; line 74, (Claim 7), dependent claim "7" should be --1--.

Signed and sealed this 26th day of June 1973.

(SEAL)
Attest:

EDWARD M. FLETCHER, JR.
Attesting Officer

ROBERT GOTTSCHALK
Commissioner of Patents